(12) United States Patent
Petrick et al.

(10) Patent No.: US 7,138,636 B2
(45) Date of Patent: Nov. 21, 2006

(54) SYSTEMS, METHODS AND APPARATUS TO CALIBRATE A SOLID STATE X-RAY DETECTOR

(75) Inventors: Scott William Petrick, Sussex, WI (US); Alan Dean Blomeyer, Milwaukee, WI (US)

(73) Assignee: General Electric Co., Schenectady, NY (US)

( * ) Notice: Subject to any disclaimer, the term of this patent is extended or adjusted under 35 U.S.C. 154(b) by 34 days.

(21) Appl. No.: 11/082,430

(22) Filed: Mar. 17, 2005

(65) Prior Publication Data

US 2006/0208195 A1 Sep. 21, 2006

(51) Int. Cl.
*G01T 1/24* (2006.01)

(52) U.S. Cl. .................................. 250/370.09
(58) Field of Classification Search ............ 250/370.09
See application file for complete search history.

(56) References Cited

U.S. PATENT DOCUMENTS

| | | | | |
|---|---|---|---|---|
| 5,693,948 A * | 12/1997 | Sayed et al. | ........... | 250/370.09 |
| 5,920,070 A | 7/1999 | Petrick et al. | | |
| 6,115,461 A * | 9/2000 | Boudry et al. | ............. | 378/98.8 |
| 6,127,684 A * | 10/2000 | Kaifu | .................... | 250/370.09 |
| 6,504,895 B1 | 1/2003 | Dixon et al. | | |
| 2006/0011853 A1* | 1/2006 | Spartiotis et al. | ...... | 250/370.13 |

* cited by examiner

*Primary Examiner*—Constantine Hannaher
(74) *Attorney, Agent, or Firm*—Carl Norton; Peter Vogel; Michael G. Smith

(57) ABSTRACT

Systems, methods and apparatus are provided through which a solid-state X-Ray detector is electronically scrubbed and a flat-field X-Ray exposure of the solid-state X-Ray detector is simulated in reference to an adjusted bias of the solid-state X-Ray detector. The simulation yields a gain image of the solid-state X-Ray detector which is in turn suitable for calibrating the solid-state X-Ray detector without projecting an X-Ray beam onto the solid-state X-Ray detector.

29 Claims, 14 Drawing Sheets

SYSTEMS, METHODS AND APPARATUS TO CALIBRATE A SOLID STATE X-RAY DETECTOR

FIELD OF THE INVENTION

This invention relates generally to maintenance of solid-state X-ray detectors, and more particularly to calibration of solid-state X-ray detectors.

BACKGROUND OF THE INVENTION

Solid-state X-Ray detectors having electronic sensors of X-Ray electromagnetic energy, rather than chemical film-based sensors. The solid-state X-Ray detectors are often referred to as electronic X-Ray detectors.

One type of conventional solid-state X-Ray detector consists of an array of pixels composed of switches as FETs (field effect transistors) and light detectors such as photodiodes, the pixels being constructed of amorphous silicon, over which Cesium Iodide (CsI) is deposited. CsI absorbs the X-rays and converts them to light, which is then detected by the photodiodes. The photodiode acts as a capacitor and will store charge. Initialization of the detector takes place prior to an X-Ray exposure, when during the course of "scrubbing" the detector, each photodiode is charged to a known voltage. The detector is then exposed to X-Rays which are absorbed by the CsI. Light that is emitted in proportion to the X-Ray flux then partially discharges the photodiode. After the conclusion of the exposure, the voltage on the photodiode is restored to the initial voltage. The amount of charge required to restore the initial voltage on the photodiode is measured, which becomes a measure of the X-Ray dose integrated by the pixel during the length of the exposure.

In accordance with the array like structure of the detector, the detector is read, or scrubbed, on a scan line by scan line basis. Reading of the detector is controlled by the FET switch associated with each photodiode. Reading is performed whenever the image produced by the detector contains valuable data. Valuable data includes images that contain exposure data and images that contain offset data. Scrubbing is very similar to reading except that the data is not informative, and is therefore discarded. Scrubbing is performed to maintain proper bias on the diodes during idle periods, or to perhaps reduce the effects of lag, which is incomplete charge restoration of the photodiodes, among other reasons. Scrubbing must restore charge, but by definition, the charge need not be measured. If the charge is measured, the data can be simply discarded.

A distinct benefit of the architecture of the solid-state X-Ray detector is that the presence of the switching element minimizes the number of electrical contacts that would need to be made to the detector. If no switching elements were present, at least one contact for each pixel would need to be present on the detector. A detector with over 1 million pixels would be impossible to develop or produce. The switching element reduces the number of required contacts to no more than the number of pixels along the perimeter of the array. The pixels in the interior of the array are "ganged" together along each axis of the array. An entire row of the array is controlled simultaneously when the scan line attached to the gates of all the FETs of pixels on that scan line is activated. Each of the pixels on that scan line is connected to a separate data line, through the switch, which is used by the read out electronics to restore the charge to the photodiode. As each scan line is activated in turn, all of the pixels in that scan line have the charge restored to the respective photodiode simultaneously by the read out electronics over the individual data lines. Each data line is associated with a dedicated read out channel.

The bias voltage to which the photodiodes are charged is simply the difference in potential between the voltage at a common contact, and the voltage of the photodiode's respective data line. In order for the photodiode to store the charge on the capacitance of the photodiode, the photodiode is reverse biased, meaning the common contact connects all of the photodiode's anodes together and is more negative in potential than any of the data lines. While the read out channel often will maintain the potential of the associated data line at what is known as a virtual ground, the read out channel may in fact be at some actual potential slightly above or below ground potential. This may be due to the architecture, implementation, or perhaps simply process variation of the read out channel design.

Each pixel in the detector, and each readout channel will have variations in gains and offset relative to other pixels and readout channels. Consequently, in order to present the best image quality, X-Ray images have these variations normalized or corrected, before the image is presented for patient diagnosis. Offset readings, requiring no X-Rays, can be taken any time, and in fact to get the most accurate offset reading, a "dark" image is often acquired close in time to the X-Ray image. As part of the correction, the "dark" image is subtracted from the X-Ray image. Gain calibration and correction, however, requires X-Ray images. Prior to the first patient, one or more "flat field" X-Ray images are acquired, with nothing between the X-Ray tube and the detector. If there were no gain, offset or X-Ray flux variations over the surface of the detector, and no gain or offset variation in the readout channels, all of the pixels would report exactly the same value. However, this is known not to be the case. This flat field X-Ray image is then used to normalize all of the individual pixels (after offset correction) to nearly the same value. The factor used to normalize each pixel then becomes a gain "map." By default, because the readout channels are used to acquire these images, the gain and offset variations of the readout channels are also corrected by the gain map, offset correction and no special separate treatment of gain and offset variations of the readout channels are required. This gain map is then used to normalize all of the diagnostic X-Ray images that are acquired subsequently.

Detectors are composed of discrete detecting or imaging elements numbering in the millions of which at least one of the imaging elements will be defective. Recognizing that the probability of fabricating a defect free panel is very low, a special interpolating correction is performed for those pixels whose offset or gain values fall outside an acceptable range. These "bad pixels" are replaced by a combination of neighboring pixels. The bad pixels are identified in the offset image by an offset being too high (too much leakage, for example) or an offset being too low (saturated). In the gain image, the bad pixels may be saturated (high) or may not react enough to the X-Ray stimulus to be considered viable. However, this calibration also requires X-Rays.

In order to maintain optimum image quality, frequent calibration is encouraged. However, this requires user intervention, to generate the X-Rays at a time when there is nothing "in the beam" in front of the detector. During calibration, the system is not available for use, resulting in loss of productivity of the X-Ray system. Furthermore, because human intervention is required, mistakes are often made which may adversely affect image quality until the next calibration is performed.

For the reasons stated above, and for other reasons stated below which will become apparent to those skilled in the art upon reading and understanding the present specification, there is a need in the art to calibrate the gain of the solid-state X-Ray detectors without projecting an X-Ray beam onto the detector in order to generate normalized images from the solid-state X-Ray detectors. There is also a need in the art to identify bad pixels in the solid-state X-Ray detectors without projecting an X-Ray beam onto the detector. There is furthermore a need in the art to calibrate solid-state X-Ray detectors without interrupting productive use of the X-Ray system.

BRIEF DESCRIPTION OF THE INVENTION

The above-mentioned shortcomings, disadvantages and problems are addressed herein, which will be understood by reading and studying the following specification.

In one aspect, a solid-state X-Ray detector is electronically scrubbed and a flat-field X-Ray exposure of the solid-state X-Ray detector is simulated, in reference to an adjusted bias of the solid-state X-Ray detector, which yields a gain image of the solid-state X-Ray detector. The gain image is suitable for calibrating the solid-state X-Ray detector, thus the need in the art to calibrate the gain of the solid-state X-Ray detector without projecting an X-Ray beam onto the solid-state X-Ray detector is satisfied.

In another aspect, a method includes scrubbing the solid-state X-Ray detector, changing a common potential at a common contact of the solid-state X-Ray detector, delaying; a first reading of the solid-state X-Ray detector yielding a gain image of the solid-state X-Ray detector, a second reading of the solid-state X-Ray detector after the first reading, yielding an offset image of the solid-state X-Ray detector, generating a gain map of the solid-state X-Ray detector from the gain image and the offset image of the solid-state X-Ray detector, and normalizing the X-ray image from the solid-state X-Ray detector in reference to the gain map. Thus, the need in the art to normalize an X-ray image from the solid-state X-Ray detector is satisfied without projecting an X-Ray beam onto the solid-state X-Ray detector.

In yet another aspect, a method includes scrubbing the solid-state X-Ray detector, changing a common potential at a common contact of the solid-state X-Ray detector, holding a scan drive control of the solid-state X-Ray detector at an "off" state, charging a plurality of data lines of the solid-state X-Ray detector, reading the solid-state X-Ray detector, yielding a gain image of the solid-state X-Ray detector, generating a gain map of the solid-state X-Ray detector from the gain image of the solid-state X-Ray detector, and normalizing an X-ray image from the solid-state X-Ray detector in reference to the gain map.

In still another aspect, a method includes scrubbing the solid-state X-Ray detector, adjusting the bias of the solid-state X-Ray detector, reading the solid-state X-Ray detector after a delay time period, yielding a gain image of the solid-state X-Ray detector, and calibrating the solid-state X-Ray detector from the gain image.

In a further aspect, a system includes an electronic X-Ray detector, a processor operably coupled to the electronic X-Ray detector, a storage device operably coupled to the processor, and software apparatus operative on the processor for holding a scan drive control of the electronic X-Ray detector at an "off" state, adjusting the common potential, reading the electronic X-Ray detector after a delay time period, yielding a gain image of the electronic X-Ray detector, and calibrating the electronic X-Ray detector from the gain image.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, methods of embodiments are described. In the third section, the hardware and the operating environment in conjunction with which embodiments may be practiced are described. In the fourth section, particular implementations are described. Finally, in the fifth section, a conclusion of the detailed description is provided.

System Level Overview

Figure 1:
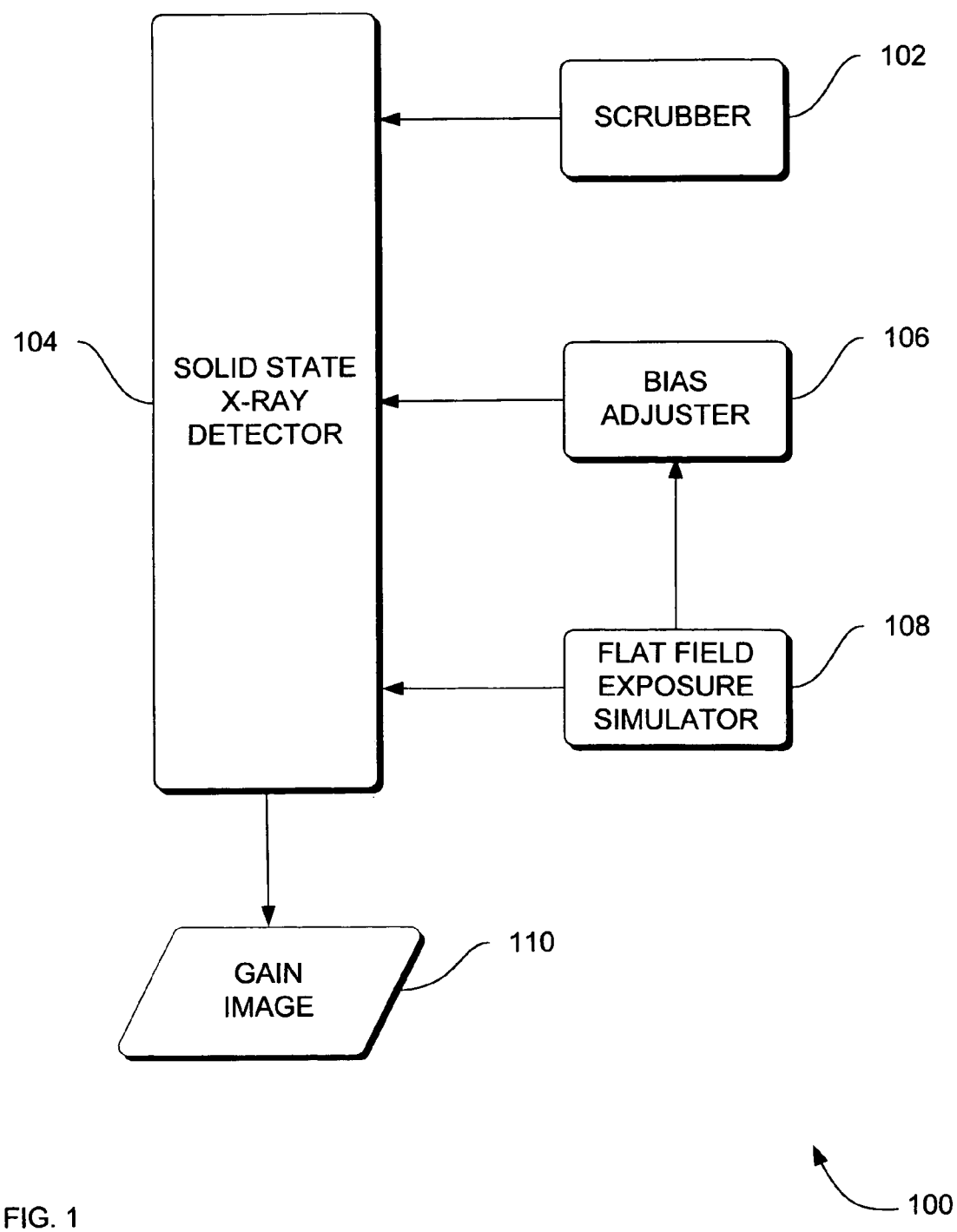
FIG. 1 is a block diagram that provides a system level overview of a system to generate a gain image of a solid-state X-Ray detector having an adjustable bias.

FIG. 1 is a block diagram that provides a system level overview of a system to generate a gain image of a solid-state X-Ray detector having an adjustable bias. System 100 solves the need in the art to need in the art to calibrate solid-state X-Ray detectors without projecting an X-Ray beam onto the detector.

System 100 includes a scrubber 102 of the solid-state X-Ray detector 104. System 100 also includes a bias adjuster 106 of the solid-state X-Ray detector 104 that is operable to adjust a bias of the solid-state X-Ray detector 104. System 100 also includes a flat-field X-Ray exposure simulator 108 of the solid-state X-Ray detector 104 that operates in reference to an adjusted bias of the solid-state X-Ray detector 104. The simulator 108 acting on the X-Ray detector 104 yields the gain image 110 of the solid-state X-Ray detector 104.

The gain image 110 is suitable for use in calibrating the solid-state X-Ray detector 104. Thus, system 100 generates a gain image for calibrating the solid-state X-Ray detector 104 without projecting an X-Ray beam onto the detector. Accordingly, system 100 satisfies the need in the art to calibrate the gain of the solid-state X-Ray detector 104 without projecting an X-Ray beam onto the detector.

The system level overview of the operation of an embodiment is described in this section of the detailed description. Some embodiments operate in a multi-processing, multi-threaded operating environment on a computer, such as computer 802 in FIG. 8 or control unit 914 in FIG. 9.

While the system 100 is not limited to any particular scrubber 102, solid-state X-Ray detector 104, bias adjuster 106, flat-field X-Ray exposure simulator 108, and gain image 110, for sake of clarity a simplified scrubber 102, solid-state X-Ray detector 104, bias adjuster 106, flat-field X-Ray exposure simulator 108, and gain image 110 are described.

METHODS OF AN EMBODIMENT

In the previous section, a system level overview of the operation of an embodiment is described. In this section, the particular methods of such an embodiment are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware are also composed of computer-executable instructions. Methods 200–700 are performed by a program executing on, or performed by firmware or hardware that is a part of, a computer, such as computer 802 in FIG. 8.

Figure 2:
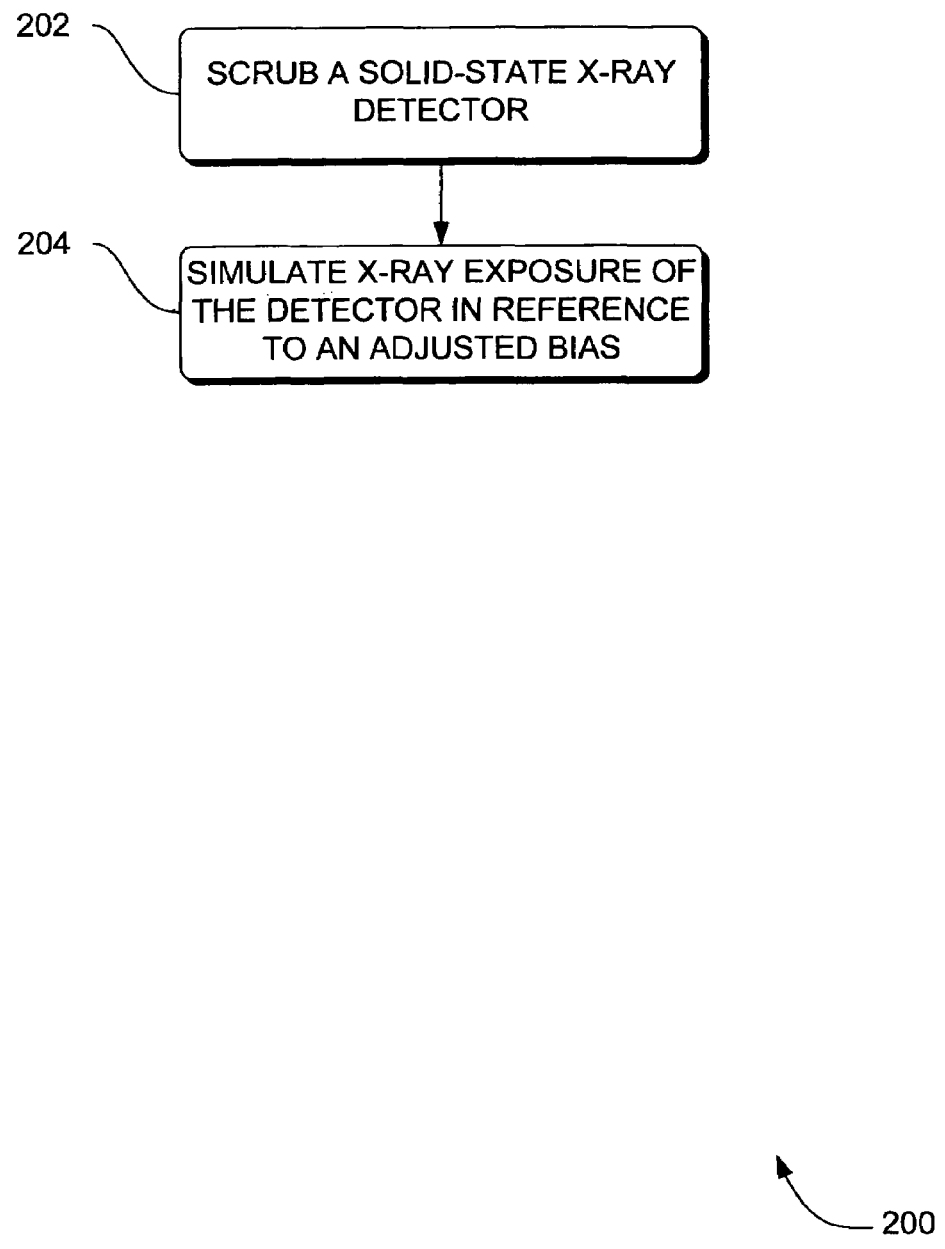
FIG. 2 is a flowchart of a method to generate a gain image of a solid-state X-Ray detector having an adjustable bias, according to an embodiment.

FIG. 2 is a flowchart of a method 200 to generate a gain image of a solid-state X-Ray detector having an adjustable bias, according to an embodiment. The gain image is suitable for calibration of at least one image from the solid-state X-Ray detector. Gain image 110 in FIG. 1 is one example of the gain image acquisition of method 200 and solid-state X-Ray detector 104 in FIG. 1 is one example of the solid-state X-Ray detector in FIG. 2. Method 200 provides a method to calibrate solid-state X-Ray detectors without projecting an X-Ray beam onto the detector.

Method 200 includes scrubbing 202 the solid-state X-Ray detector. In some embodiments, the scrubbing includes setting all pixels to a certain value such as to a fully charged value, the photodiode bias, which is the difference in potential between the data line that the photodiode sits on, and the common potential.

Method 200 also includes simulating 204 a flat-field X-Ray exposure of the solid-state X-Ray detector in reference to an adjusted bias of the solid-state X-Ray detector. The simulating 204 yields the gain image of the solid-state X-Ray detector.

Figure 3:
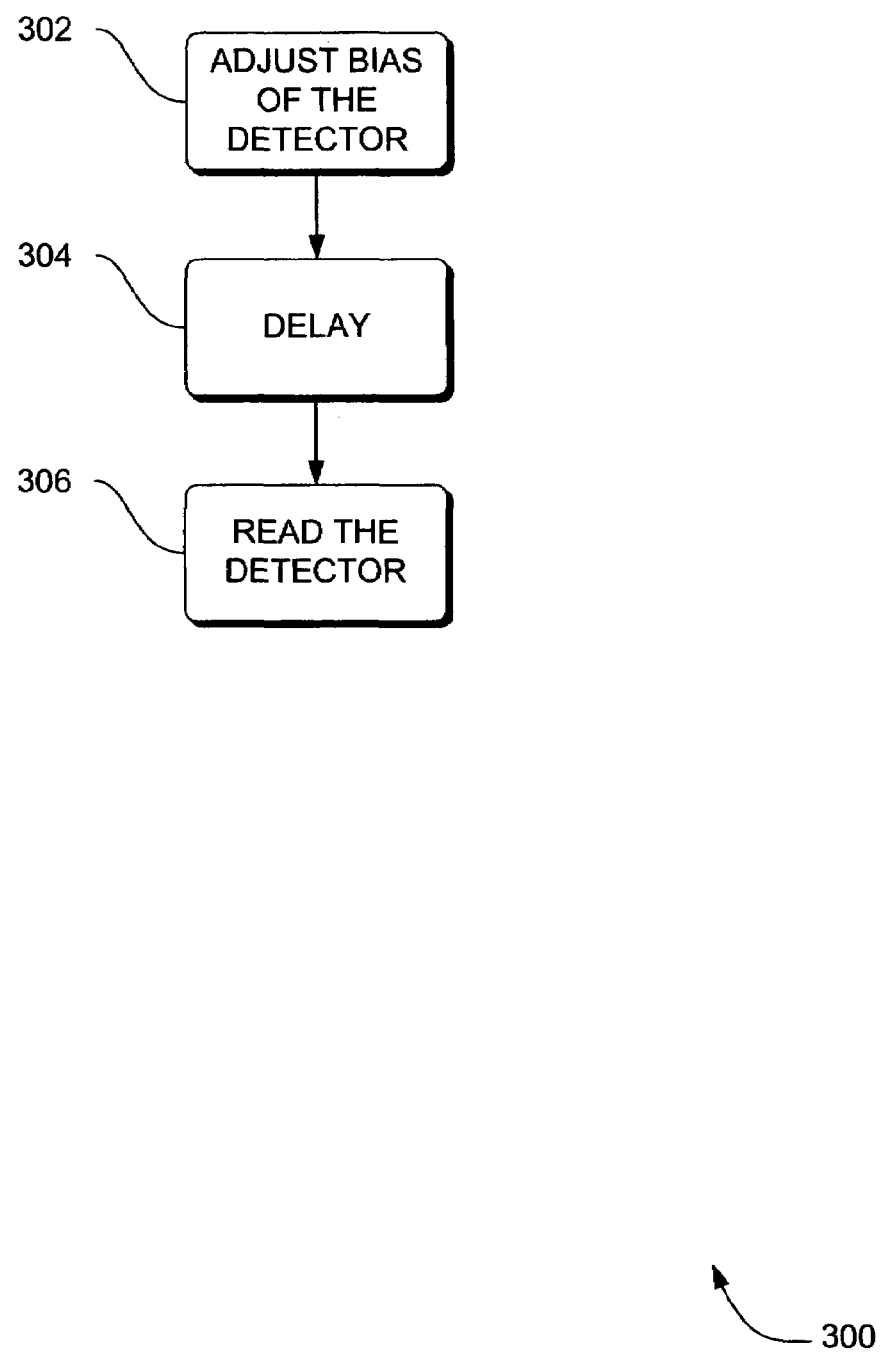
FIG. 3 is a flowchart of a method to simulate a flat-field X-Ray exposure of the solid-state X-Ray detector, according to an embodiment that generates a gain image.

FIG. 3 is a flowchart of a method 300 to simulate a flat-field X-Ray exposure of the solid-state X-Ray detector, according to an embodiment. Method 300 is one embodiment of simulating 204 a flat-field X-Ray exposure of the solid-state X-Ray detector, in FIG. 2.

Method 300 includes adjusting 302 the bias of the solid-state X-Ray detector. In some embodiments, the adjusting includes changing a common potential at a common contact of the solid-state X-Ray detector. One such embodiment is described in U.S. Pat. No. 5,920,070 in which a solid-state X-Ray detector includes an adjustable bias, by means of an adjustable potential at the common contact. In some embodiments, the common potential is equal to or represents the maximum dynamic range required of the solid-state X-Ray detector. In some embodiments, the adjusting 302 includes changing a data line potential.

Thereafter, method 300 includes reading 306 the solid-state X-Ray detector after delaying 304 a time period, yielding a gain image of the solid-state X-Ray detector.

The gain image provides information from which a map of bad pixels in the solid-state X-Ray detector can be derived. A bad pixel is a pixel that provides no response (too insensitive to X-Ray radiation), or too much response (too sensitive to X-Ray radiation). This embodiment identifies bad pixels in the solid-state X-Ray detectors without projecting an X-Ray beam onto the detector.

Figure 4:
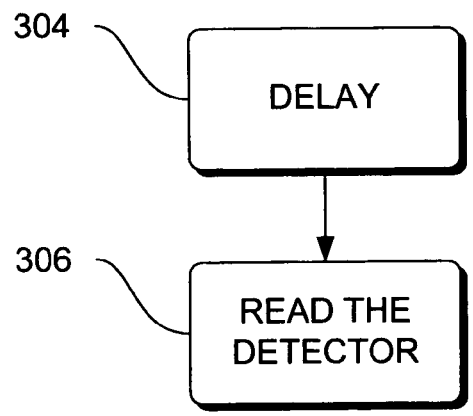
FIG. 4 is a flowchart of a method to simulate a flat-field X-Ray exposure of the solid-state X-Ray detector, according to an embodiment that generates an offset image.
Figure 4:
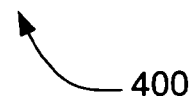

FIG. 4 is a flowchart of a method 400 to simulate a flat-field X-Ray exposure of the solid-state X-Ray detector, according to an embodiment that generates an offset image. Method 400 is one embodiment of simulating 204 a flat-field X-Ray exposure of the solid-state X-Ray detector, in FIG. 2.

Method 400 includes reading 306 the solid-state X-Ray detector after delaying 304 a time period, yielding an offset image of the solid-state X-Ray detector.

When method 300 above and method 400 are performed, the gain image that is generated by method 300 and the offset image that is generated by method 400 in combination provide information from which a map of bad pixels in the solid-state X-Ray detector can be derived. This identifies bad pixels in the solid-state X-Ray detectors without projecting an X-Ray beam onto the detector.

Figure 5:
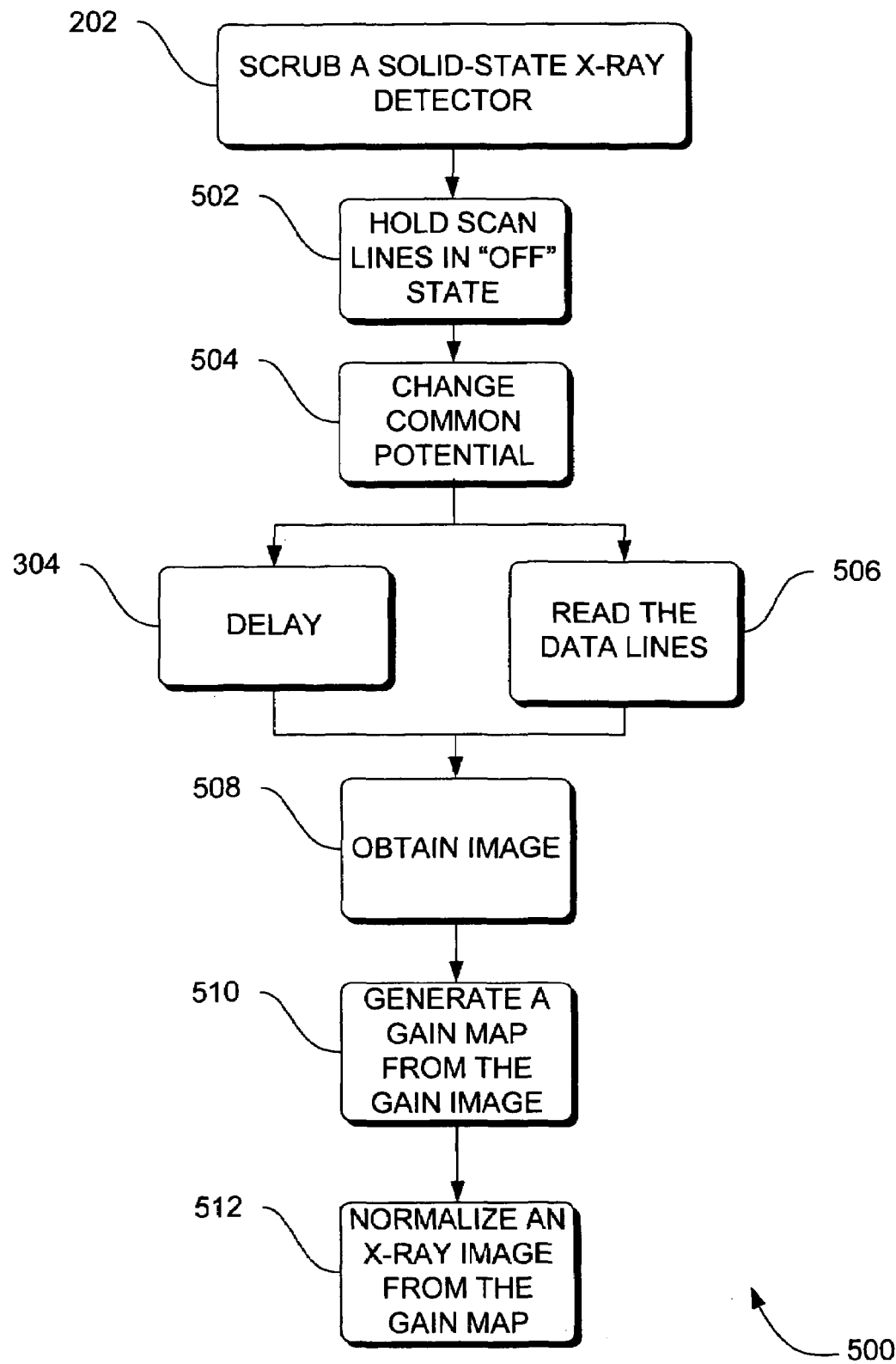
FIG. 5 is a flowchart of a method of generating a normalized image of a solid-state X-Ray detector according to an embodiment.

FIG. 5 is a flowchart of a method 500 of generating a normalized image of a solid-state X-Ray detector according to an embodiment. Method 500 solves the need in the art to provide normalized images from a solid-state X-Ray detector without projecting an X-Ray beam onto the detector.

Method 500 includes holding 502 the scan lines of the detector in an "off" state. In the "off" state, the field-effect transistors (FETs) on the solid-state X-Ray detector are not conducting. In effect, the FETs operate as an open switch. In the "on" state the FETs are conducting, in effect a closed switch. Method 500 also includes scrubbing 202 the solid-state X-Ray detector and changing 504 a common potential at a common contact of the solid-state X-Ray detector.

Method 500 also includes delaying 506. Two manners of delaying 506 are described in method 600 below. Delaying has more than one purpose. The common potential, due to the relatively high impedance of the detector, will not change instantaneously for every pixel of the solid-state X-Ray detector. Furthermore, due to the capacitance between the common contact and all of the data lines, all of the readout channels will "report" signal even if no scan lines are activated, until this data line—common contact capacitance is fully charged. Once the capacitance is fully charged, a "read" can be performed with the expectation that the signal reported by each of the pixels is only the change in bias that each pixel experienced (due to change in potential of the common contact) since the last scrub 202.

While delaying 506, method 500 also includes reading 506 the plurality of data lines of the solid-state X-Ray detector, yielding information indicating whether or not the capacitance of the solid state X-Ray detector is charged. The delaying 506 and the reading 506 are performed in parallel. In some embodiments, the reading 506 is not performed.

Thereafter, method 500 also includes obtaining 508 an image from the solid-state X-Ray detector. Obtaining 508 an image from the detector after scrubbing 202, changing the common potential 504 and delaying 506 yields a gain image of the solid-state X-Ray detector. Obtaining 508 an image includes scanning the panel, which further includes cycling the scan electronics while simultaneously cycling the readout electronics attached to the data lines, which results in a reading of the signal on the data lines at that time.

Method 500 also includes generating 510 a gain map of the solid-state X-Ray detector from the gain image of the solid-state X-Ray detector.

Method 500 also includes normalizing or calibrating 512 the X-ray image from the solid-state X-Ray detector in reference to the gain map.

By changing 504 the potential in a controlled fashion in conjunction with a delayed 506 obtaining an image 508 of the solid-state X-Ray detector, a "flat field" X-Ray exposure is simulated. Changing 504 the potential between readout frames will "look" like a signal to the photodiodes of the solid-state X-Ray detector, which will be required to charge by the same change in potential the first frame after the change in potential of the common contact. By virtue of the change in common contact potential, the "read" image will look more like a "gain" image that can be used to form the gain map.

Figure 6:
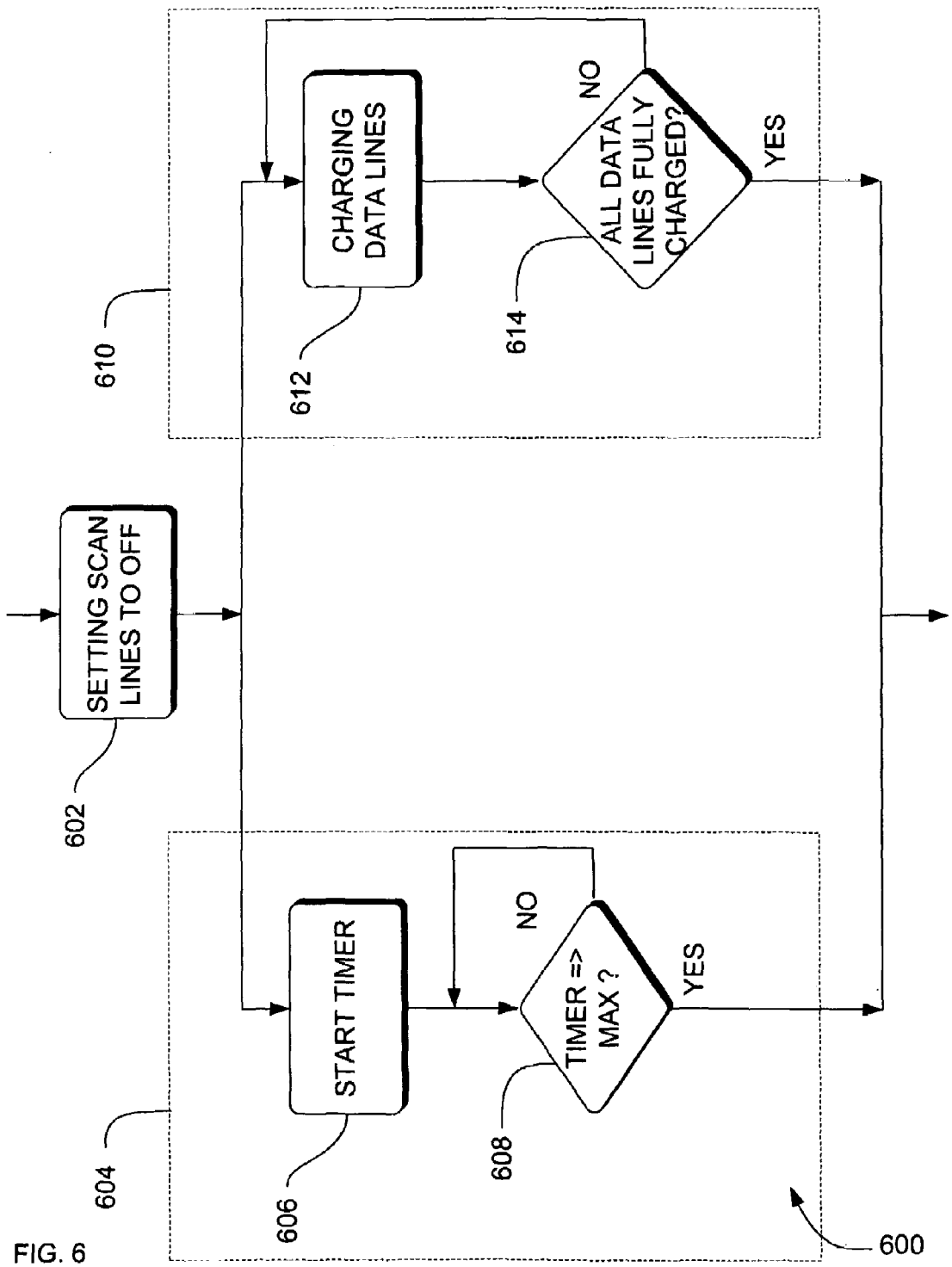
FIG. 6 is a flowchart of a method of delaying according to an embodiment.

FIG. 6 is a flowchart of a method 600 of delaying according to an embodiment. Method 600 describes two manners of delaying 506 in FIG. 5. Method 600 includes setting 602 all of a plurality of scan lines of the solid-state X-Ray detector to an off state. Thereafter, either one of the two manners of delaying is performed.

In a first manner of delaying, the delaying 600 includes delaying 604 a predetermined time period. In some embodiments of method 600, delaying by a predetermined time period 604 includes starting a timer 606 and polling time until the time value is equal to or greater than 608 a predetermined maximum value.

A second manner of delaying is adaptive delaying 610, which includes charging 612 all of a plurality of data lines of the solid-state X-Ray detector and delaying until 614 all of a plurality of data lines of the solid-state X-Ray detector are about fully charged. The second manner of delaying is adaptive in that continuous measurement of the signal is performed until the signal reaches an acceptable level which indicates that all data lines are fully charged; which is self optimizing. The second manner of delaying 610 is performed no longer than is absolutely necessary, yet acquisition of a gain image is not corrupted with a signal from the data line capacitance charging. The delaying action 610 adapts to changes in the charge in the data line.

Any one of the two manners of delaying 604 or 610 in method 600 can be implemented in a system, method or apparatus.

Figure 7:
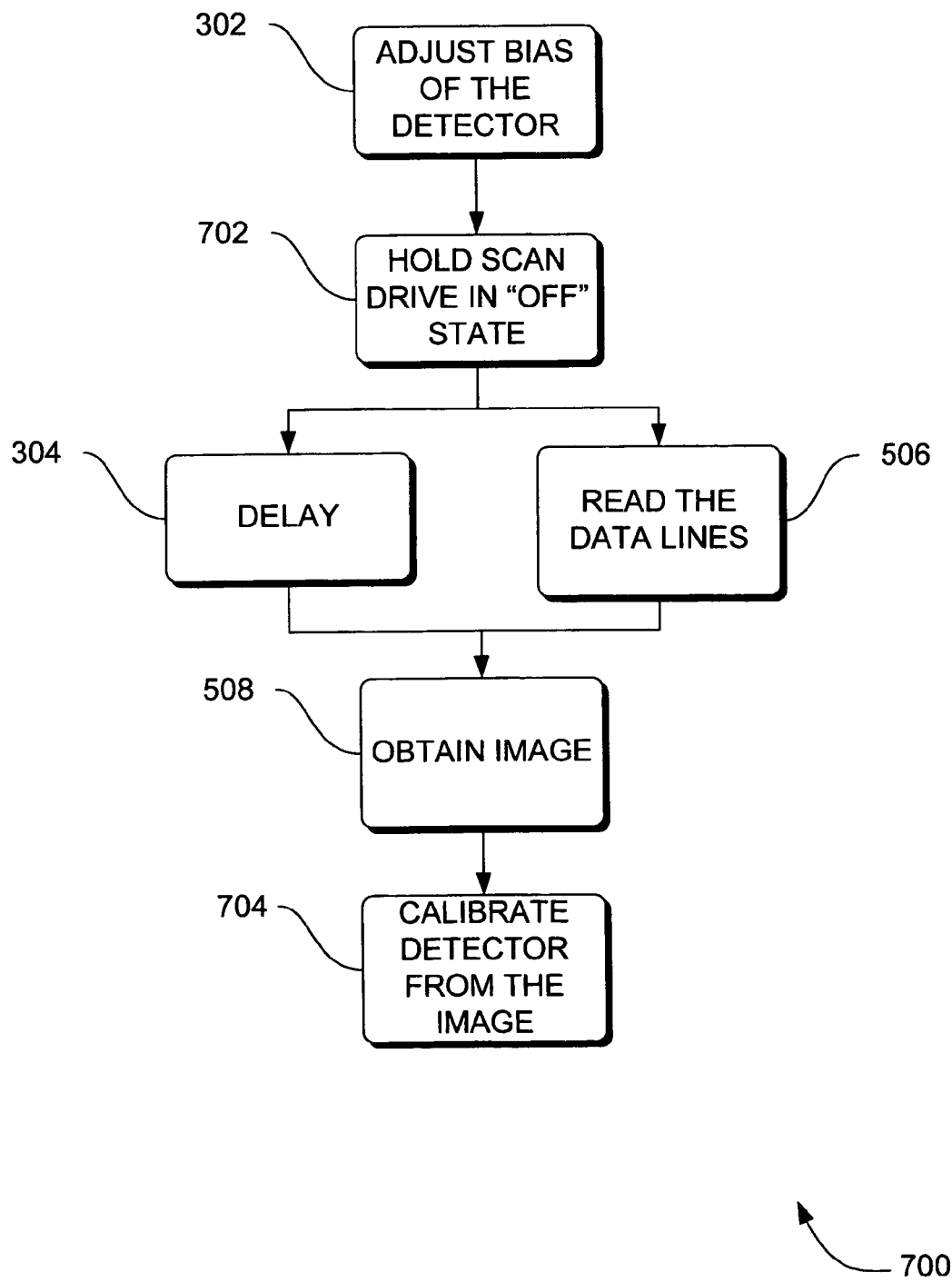
FIG. 7 is a flowchart of a method of calibrating the solid-state X-Ray detector according to an embodiment.

FIG. 7 is a flowchart of a method 700 of calibrating the solid-state X-Ray detector according to an embodiment. Method 700 solves the need in the art to calibrate the solid-state X-Ray detector without projecting X-Ray beams onto the solid-state X-Ray detector. Some embodiments of method 700 also provide a means to calibrate the solid-state X-Ray detector without interrupting operational productive use of the X-Ray system.

Method 700 includes adjusting 302 the bias of the solid-state X-Ray detector. In some embodiments, the adjusting 302 includes changing a common potential at a common contact of the solid-state X-Ray detector. In some embodiments, the adjusting 302 includes changing a data line potential.

Method 700 includes holding 702 scan drivers in an "off" state. Method 700 also includes delaying 506 while reading 506 the plurality of data lines of the solid-state X-Ray detector, which thereafter obtains 508 a gain image of the solid-state X-Ray detector. Thereafter, the solid-state X-Ray detector is calibrated 704 in reference to the image of the solid-state X-Ray detector.

In some embodiments, a single X-Ray is used to calibrate the entire detector. The system then invokes heuristics to "learn" what change in common potential most closely represented a signal of the same magnitude, storing this change in common potential and using the change in common potential as a base reference in calibrating 704 the solid-state X-Ray detector. Furthermore, other values of common contact potentials could be used by the solid-state X-Ray detector to calibrate detector gain at a different signal level, in that the same solid-state X-Ray detector might be used for different applications or imaging modes. Because the system controls the common contact potential, these other values will scale from the original "learned" value, and the effect on a gain map is predicted by a simple scalar multiplication from the "learned" gain and its associated gain map. Thus, method 700 requires fewer X-Ray exposures to calibrate the solid-state X-Ray detector.

Methods 200–700 can be performed by an X-Ray system at any time, because it does not use X-Rays. Methods 200–700 can also be performed on a regular basis, transparent (without notice) to a clinician or technician of the X-Ray system. Methods 200–700 can also be aborted before the entire method is performed should diagnostic imaging demands require it.

Figure 8:
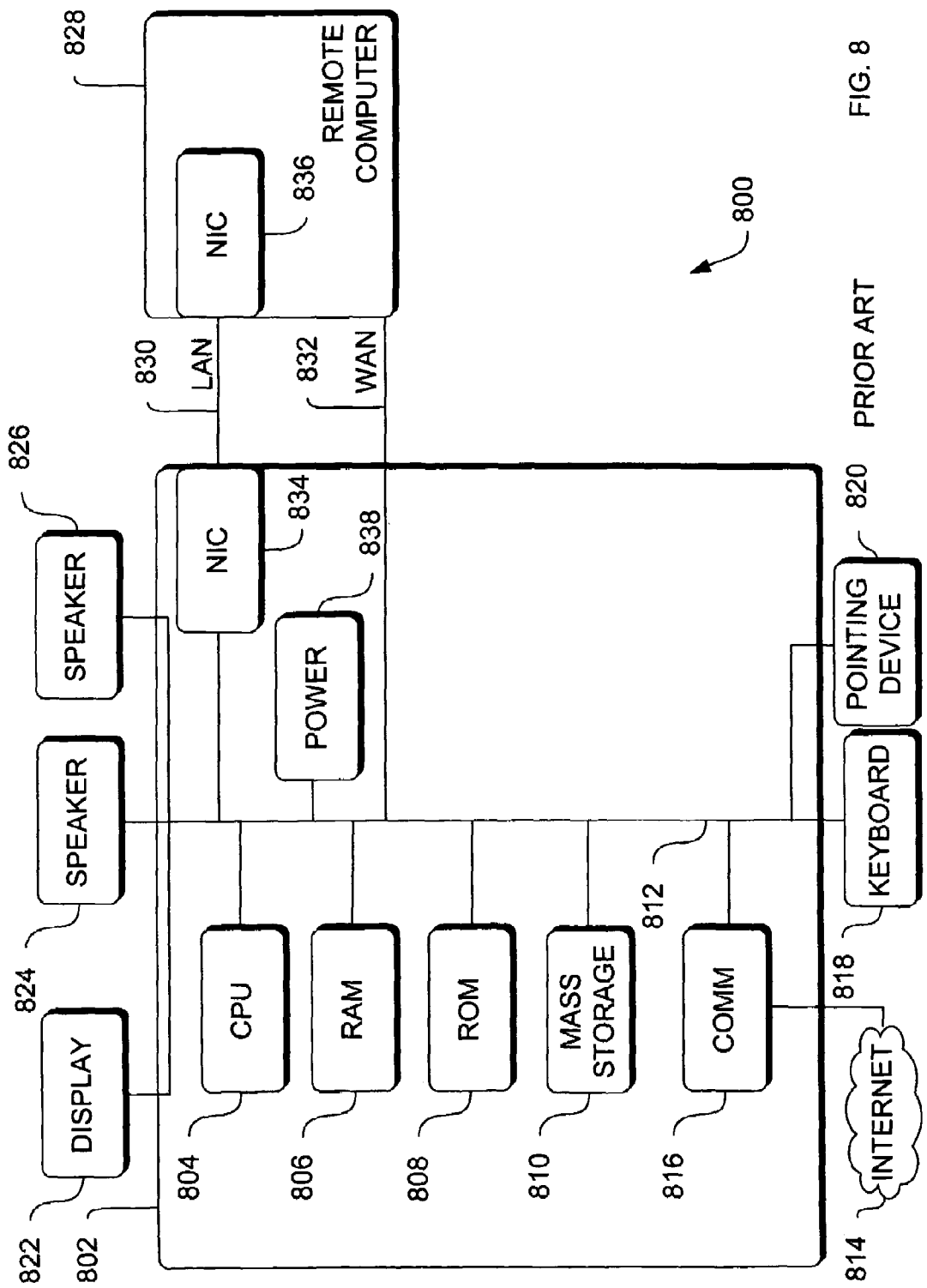
FIG. 8 is a block diagram of the hardware and operating environment in which different embodiments can be practiced.
Figure 9:
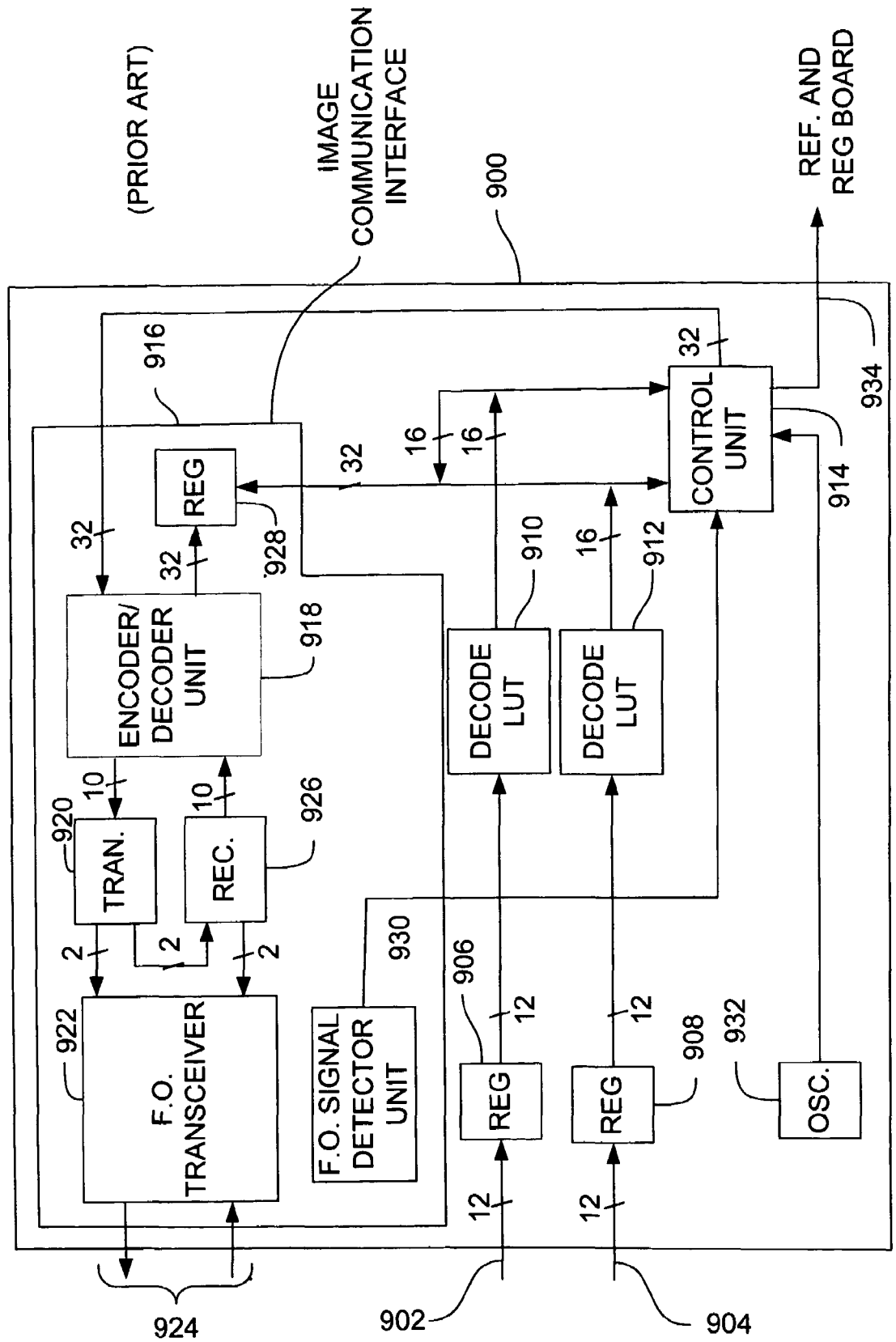
FIG. 9 is a block diagram of a detector control board according to an embodiment.

In some embodiments, methods 200-700 are implemented as a computer data signal embodied in a carrier wave, that represents a sequence of instructions which, when executed by a processor, such as processor 804 in FIG. 8 or control unit 914 in FIG. 9, cause the processor to perform the respective method. In other embodiments, methods 200–700 are implemented as a computer-accessible medium having executable instructions capable of directing a processor, such as processor 804 in FIG. 8 or control unit 914 in FIG. 9, to perform the respective method. In varying embodiments, the medium is a magnetic medium, an electronic medium, or an optical medium.

In some embodiments, methods 200–700 operate as a background process on processor 804 in FIG. 8 or control unit 914 in FIG. 9, that does not interrupt the operation of the solid-state X-Ray detector or the X-Ray system and that operates transparently to a human operator of the X-Ray system. In some embodiments, the background process can be scheduled to begin without any intervention or initiation from the human operator. In some embodiments, the background process is initiated by the human operator through software graphical user interface. These embodiments satisfy the need in the art to calibrate solid-state X-Ray detectors without interrupting productive use of the X-Ray system.

Apparatus components that implement methods 200–700 can be embodied as computer hardware circuitry, on a detector control board or as a computer-readable program, or a combination of both.

More specifically, in the computer-readable program embodiments, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 802 in FIG. 8, or on at least as many computers as there are components.

Hardware and Operating Environment

FIG. 8 is a block diagram of the hardware and operating environment 800 in which different embodiments can be practiced. The description of FIG. 8 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 802 includes a processor 804, commercially available from Intel, Motorola, Cyrix and others. Computer 802 also includes random-access memory (RAM) 806, read-only memory (ROM) 808, and one or more mass storage devices 810, and a system bus 812, that operatively couples various system components to the processing unit 804. The memory 806, 808, and mass storage devices, 810, are types of computer-accessible media. Mass storage devices 810 are more specifically types of nonvolatile computer-accessible media and can include one or more hard disk drives, floppy disk drives, optical disk drives, and tape cartridge drives. The processor 804 executes computer programs stored on the computer-accessible media.

Computer 802 can be communicatively connected to the Internet 814 via a communication device 816. Internet 814 connectivity is well known within the art. In one embodiment, a communication device 816 is a modem that responds to communication drivers to connect to the Internet via what is known in the art as a "dial-up connection." In another embodiment, a communication device 816 is an Ethernet® or similar hardware network card connected to a local-area network (LAN) that itself is connected to the Internet via what is known in the art as a "direct connection" (e.g., T1 line, etc.).

A user enters commands and information into the computer 802 through input devices such as a keyboard 818 or a pointing device 820. The keyboard 818 permits entry of textual information into computer 802, as known within the art, and embodiments are not limited to any particular type of keyboard. Pointing device 820 permits the control of the screen pointer provided by a graphical user interface (GUI) of operating systems such as versions of Microsoft Windows®. Embodiments are not limited to any particular pointing device 820. Such pointing devices include mice, touch pads, trackballs, remote controls and point sticks. Other input devices (not shown) can include a microphone, joystick, game pad, satellite dish, scanner, or the like.

In some embodiments, computer 802 is operatively coupled to a display device 822. Display device 822 is connected to the system bus 812. Display device 822 permits the display of information, including computer, video and other information, for viewing by a user of the computer. Embodiments are not limited to any particular display device 822. Such display devices include cathode ray tube (CRT) displays (monitors), as well as flat panel displays such as liquid crystal displays (LCD's). In addition to a monitor, computers typically include other peripheral input/output devices such as printers (not shown). Speakers 824 and 826 provide audio output of signals. Speakers 824 and 826 are also connected to the system bus 812.

Computer 802 also includes an operating system (not shown) that is stored on the computer-accessible media RAM 806, ROM 808, and mass storage device 810, and is and executed by the processor 804. Examples of operating systems include Microsoft Windows®, Apple MacOS®, Linux®, UNIX®. Examples are not limited to any particular operating system, however, and the construction and use of such operating systems are well known within the art.

Embodiments of computer 802 are not limited to any type of computer 802. In varying embodiments, computer 802 comprises a PC-compatible computer, a MacOS®-compatible computer, a Linux®-compatible computer, or a UNIX®-compatible computer. The construction and operation of such computers are well known within the art.

Computer 802 can be operated using at least one operating system to provide a graphical user interface (GUI) including a user-controllable pointer. Computer 802 can have at least one web browser application program executing within at least one operating system, to permit users of computer 802 to access an intranet, extranet or Internet world-wide-web pages as addressed by Universal Resource Locator (URL) addresses. Examples of browser application programs include Netscape Navigator® and Microsoft Internet Explorer®.

The computer 802 can operate in a networked environment using logical connections to one or more remote computers, such as remote computer 828. These logical connections are achieved by a communication device coupled to, or a part of, the computer 802. Embodiments are not limited to a particular type of communications device. The remote computer 828 can be another computer, a server, a router, a network PC, a client, a peer device or other common network node. The logical connections depicted in FIG. 8 include a local-area network (LAN) 830 and a wide-area network (WAN) 832. Such networking environments are commonplace in offices, enterprise-wide computer networks, intranets, extranets and the Internet.

When used in a LAN-networking environment, the computer 802 and remote computer 828 are connected to the local network 830 through network interfaces or adapters 834, which is one type of communications device 816. Remote computer 828 also includes a network device 836. When used in a conventional WAN-networking environment, the computer 802 and remote computer 828 communicate with a WAN 832 through modems (not shown). The modem, which can be internal or external, is connected to the system bus 812. In a networked environment, program modules depicted relative to the computer 802, or portions thereof, can be stored in the remote computer 828.

Computer 802 also includes power supply 838. Each power supply can be a battery.

FIG. 9 is a block diagram of detector control board 900 according to an embodiment. In general, detector control board 900 receives twelve bit binary encoded data 902 from first column multi-chip modules (not shown). Detector control board 900 also receives twelve bit binary encoded data 904 from second column multi-chip modules (not shown). Each of binary encoded inputs 902 and 904 are respectively received by registers 906 and 908. The outputs from registers 906 and 908 are then respectively transferred to decode look up tables ("LUTs") 910 and 912. Decode LUTs 910 and 912 are random access memories that perform a conversion from twelve bit binary quadratically encoded data into 16 bit binary linearly encoded data.

Operation of detector control board 900 is controlled by control unit 914. Control unit 914 is formed as a field programmable gate array ("FPGA"). Control unit 914 receives 16 bit pixel data from decode LUT 910 and 16 bit pixel data from decode LUT 912, then combines the pixel data into a 32 bit word. The 32 bit word is then output to image communication interface 916. According to an embodiment of the invention, image communication interface 916 is a fiber optic interface. Each 32 bit word is a combination of two 16 bit pixels, which were output separately from detector control board 900. The two pixels included in each 32 bit word may be side by side, as in a single solid-state x-ray panel or may be received from two separate panels, such as output from first panel portion and second panel portion of a cardiac/surgical solid-state x-ray panel. Radiography solid-state x-ray panel also includes two panel portions, and therefore follows the pixel format of cardiac/surgical solid-state x-ray panel. Split panel detector systems, corresponding to cardiac/surgical solid-state x-ray panel and radiography solid-state x-ray panel, utilize data "reordering" before display on a conventional computer monitor.

Image communication interface 916 clocks 32 bit words received from control unit 914 into encoder/decoder unit 918. Encoder/decoder unit 918 converts each received 32 bit word into four ten bit words, providing a means of error detection, clock encoding as well as DC balance. The ten bit words are in turn received by transmitter 920. Transmitter 920 converts the received ten bit words into differential serial data. Transmitter 920 provides the differential serial data outputs to fiber optic transceiver 922 for conversion into a fiber optic signal. The fiber optic signal is then transmitted on image detection bus 924 to a detector framing node, set forth in detail below. According to an embodiment of the present invention, image detection bus 924 is an optical fiber data link. Likewise, fiber optic transceiver 922 receives fiber optic signals from the image detection bus 924 and converts the received optical signals into a differential signal for reception by receiver 926. Receiver 926, in turn, converts the differential signal, including encoded clock and data, into ten bit words which can be checked by the receiver for legal values. The ten bit words are then received by encoder/decoder unit 918 for conversion into 32 bit words, which are stored in register 928 before transmission to control unit 914. An output from fiber optic transceiver 922 is also received by fiber optic signal detection unit 930 to maintain timing and protocol in cooperation with control unit 914. Control unit 914 is clocked by oscillator 932. Control unit 932 provides a control signal to reference and regulator board 122 by way of control line 934. In some embodiments, control unit 914 is a FPGA, Flex 10k50 manufactured by Altera, Inc. of San Jose, Calif.

Implementations

Referring to FIGS. 10–13, particular implementations are described in conjunction with methods described in conjunction with FIG. 5.

Figure 10:
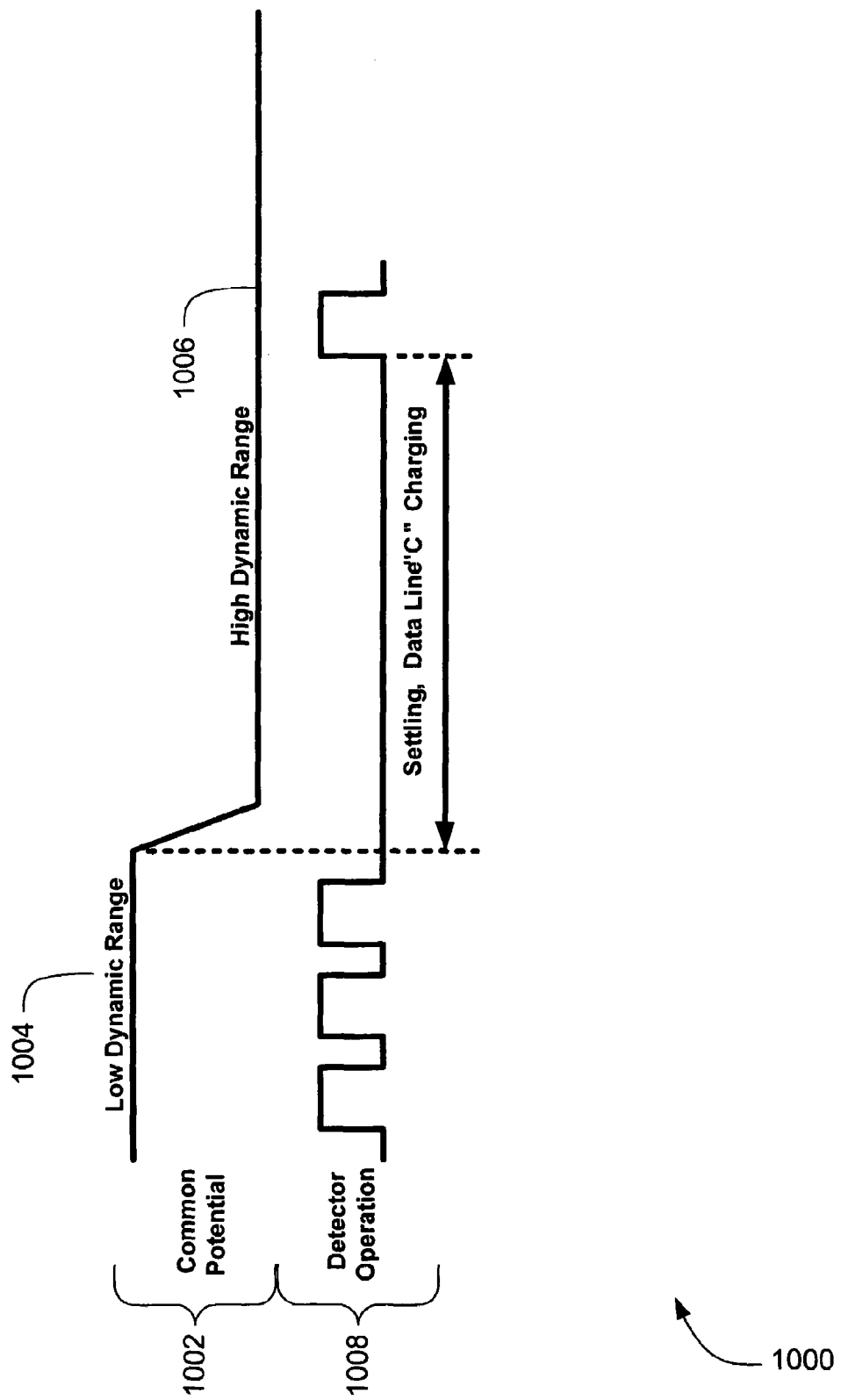
FIG. 10 is a chronological diagram of changing a common potential at a common contact of the solid-state X-Ray detector according to a second stepping embodiment.

FIG. 10 is a chronological diagram 1000 of changing a common potential at a common contact of the solid-state X-Ray detector according to a second stepping embodiment. Chronological diagram 1000 depicts one embodiment of changing 504 a common potential at a common contact of the solid-state X-Ray detector in FIG. 5 in a stepped manner.

In diagram 1000, timeline 1002 shows the common potential changing from a low dynamic range 1004 to a high dynamic range 1006. In contrast to the diagram in FIG. 11, in FIG. 10 the common potential is changed from the low dynamic range 1004 to the high dynamic range 1006 in one step of greater magnitude than the multiple steps in FIG. 11. The stepped change in common contract potential helps maintain calibration of solid-state X-Ray detectors without the use of X-Rays every time the detector is calibrated and at every calibration point (dose).

Figure 11:
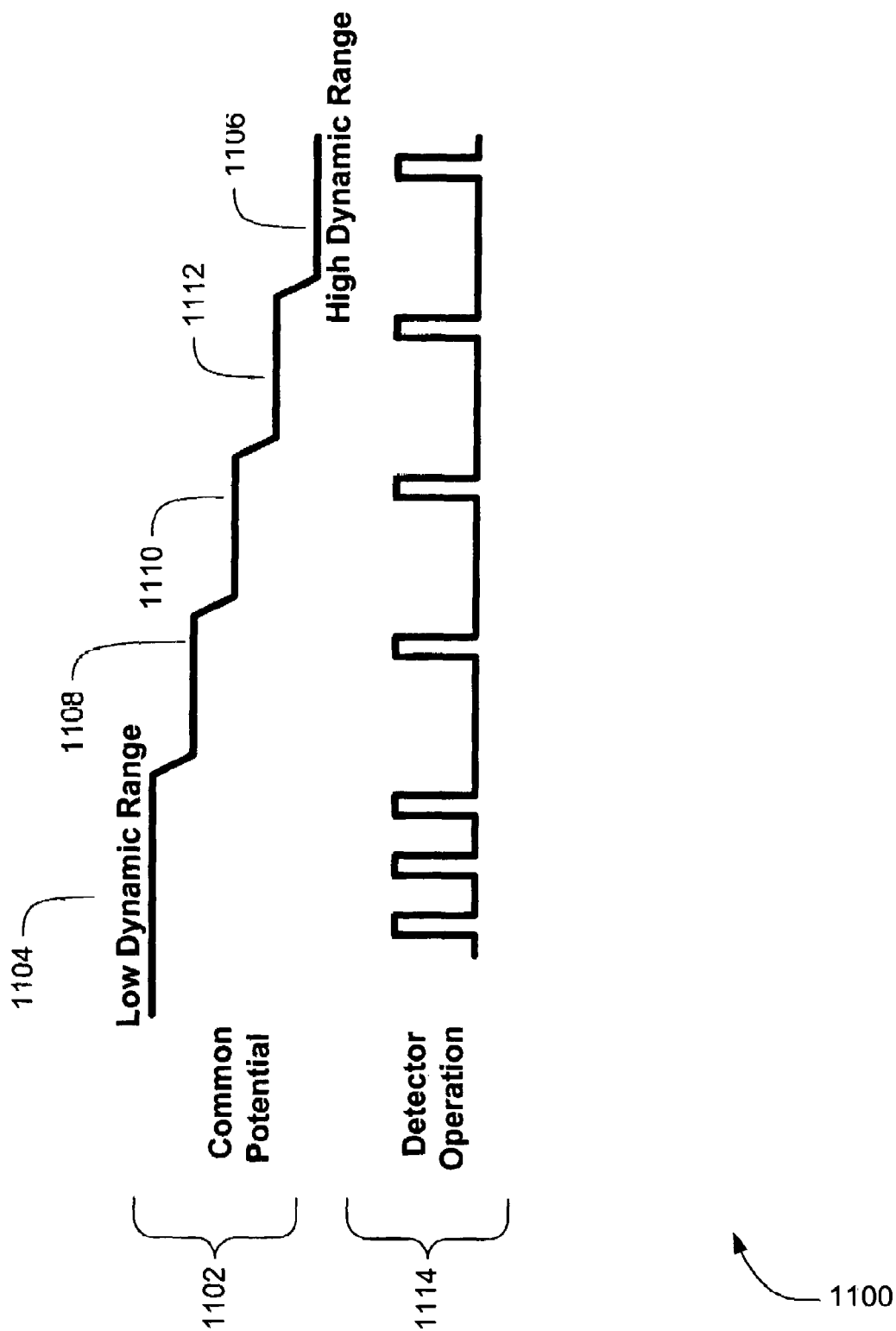
FIG. 11 is a chronological diagram of changing a common potential at a common contact of the solid-state X-Ray detector according to a multiple stepping embodiment.

FIG. 11 is a chronological diagram 1100 of changing a common potential at a common contact of the solid-state X-Ray detector according to a multiple stepping embodiment. Chronological diagram 1100 depicts one embodiment of changing 504 a common potential at a common contact of the solid-state X-Ray detector in FIG. 5 in a stepped manner.

When photodiodes of a solid-state X-Ray detector have been substantially discharged by a large dose of X-Ray, the associated switching field-effect-transistors (FETs) tend to leak due to the large potential placed across the FETs, essentially the difference in potential between the data line (which is controlled by the readout channel), and the common contact. This leakage obscures the real source of the signal as the solid-state X-Ray detector is read. The FETs are imperfect, and the signal collected by the readout channel can not be attributed to only the pixel being read. In addition, all of the pixels that happen to be leaking on that particular data line at that particular time contribute to the signal. The pixels that are read first after a large, flat field X-Ray image would tend to have the largest error associated with them. The first pixels read would have larger leakage error contributions (from all the other pixels) than the last (few or no pixels). As the pixels are read, the charge is restored to the photodiode, and the potential across the switching FETs is reduced to nearly zero, resulting in very little leakage current.

To mitigate this effect, in some embodiments, a calibration method is applied to the solid-state X-Ray detector as a series of smaller steps of change in the common contact potential, rather than one large one as shown of FIG. 10. The FETs would not see nearly as much potential, and therefore not leak nearly as much.

In diagram 1100, timeline 1102 shows the common potential changing from a low dynamic range 1104 to a high dynamic range 1106 through a series of intermediate stepped gradations of common potential, 1108, 1110 and 1112. Timeline 1114 denotes whether reading of the detector (while the detector is a "high" state) or the detector is waiting to be read (delay, shown as "low"). The stepped changes in common contract potential help maintain calibration of solid-state X-Ray detectors without the use of X-Rays every time the detector is calibrated and at every calibration point (dose). The series of smaller steps 1108, 1110 and 1112 in some embodiments provides better results with regards to leakage, yet cover the same dynamic range at the cost of longer time to calibrate as the single step in diagram 1000. Although only one read operation is depicted per step, more may be necessary to counter the effects of lag.

Figure 12:
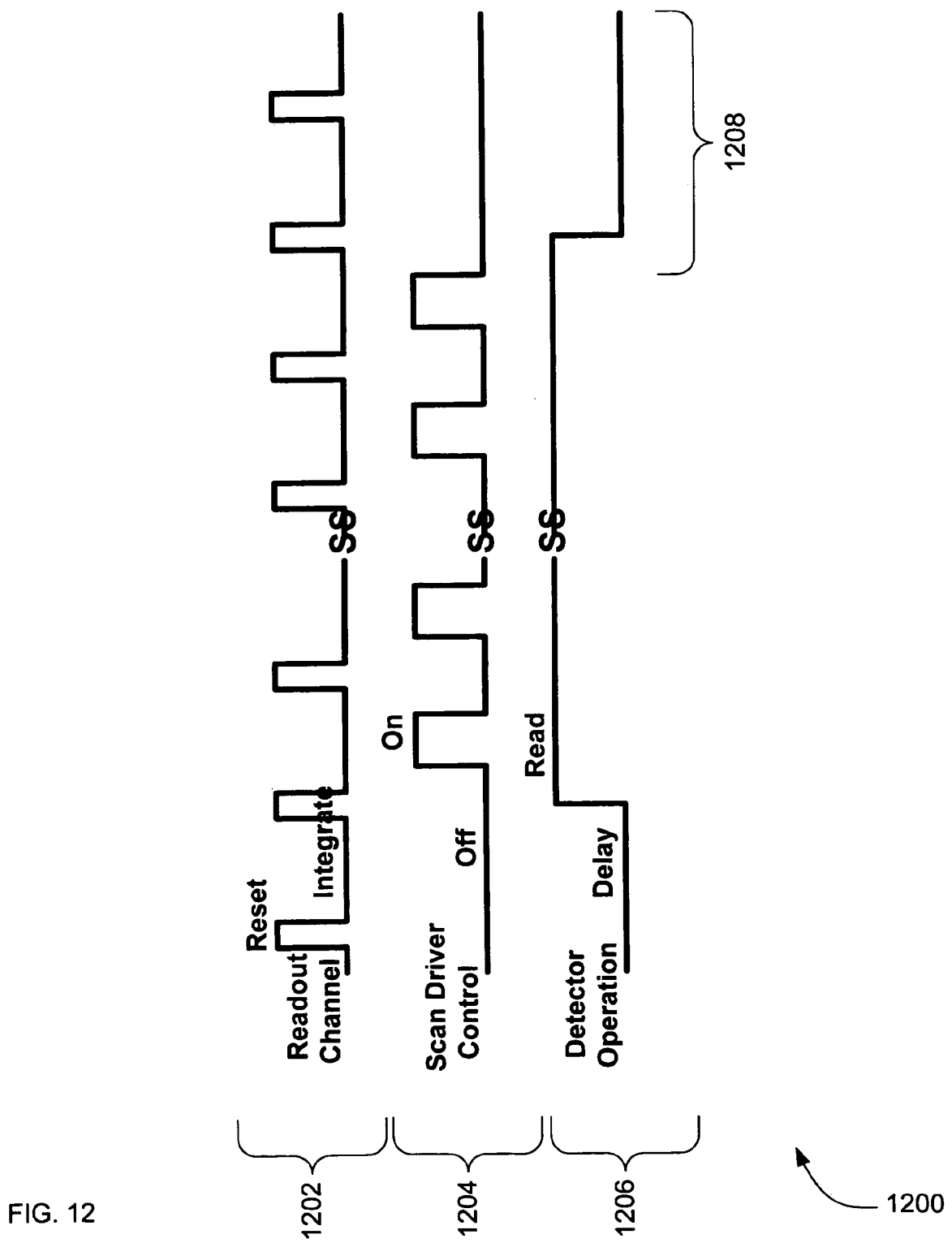
FIG. 12 is a chronological diagram of a read operation of the solid-state X-Ray detector according to an embodiment.

FIG. 12 is a chronological diagram 1200 of a read operation of the solid-state X-Ray detector according to an embodiment. Chronological diagram 1200 depicts one embodiment of the timing of reading 506 in FIG. 5.

In diagram 1200, readout channels are cycled constantly in timeline 1202, while scan drivers are being held "off" between frames in timeline 1204. Timeline 1206 denotes whether the detector is actually being read (while detector is in "high" state) or is waiting to be read (delay, shown as "low"). During a latter period 1208, the scan drivers are held in "off" state.

Figure 13:
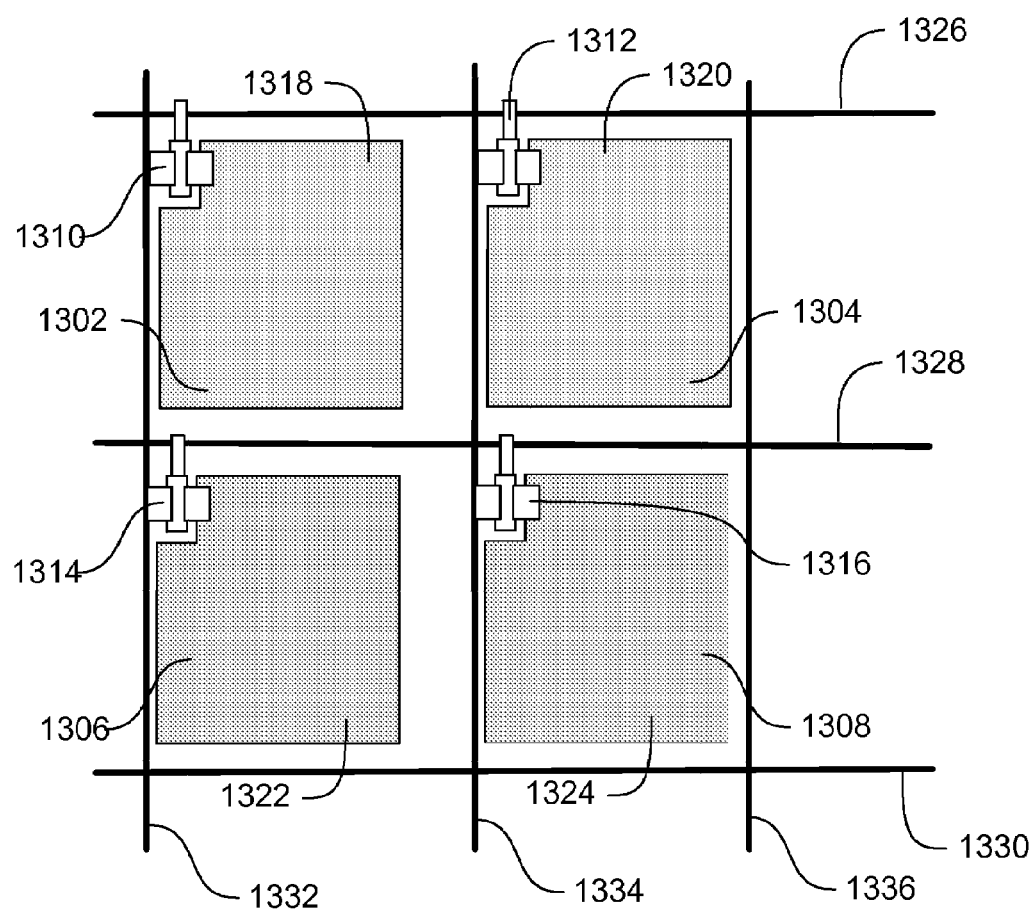
FIG. 13 is a diagram of a prior art plan view of a cluster of four pixels of a prior art solid-state X-Ray detector.

FIG. 13 is a diagram of a prior art plan view of a cluster 1300 of four pixels of a prior art solid-state X-Ray detector. Each of the clusters 1300 of four pixels, 1302, 1304, 1306, 1308 includes a field-effect-transistor, 1310, 1312, 1314 and 1316 respectively and a photodiode 1318, 1320, 1322 and 1324 respectively. The pixels are separated vertically by scan lines, such as scan lines 1326, 1328 and 1330, and are separated horizontally by data lines, such as data lines 1332, 1334 and 1336. The clusters are implemented in both medical radiographic, medical cardiographic, angiographic, mammographic, and radiographic and fluoroscopic (R&F) detectors.

Figure 14:
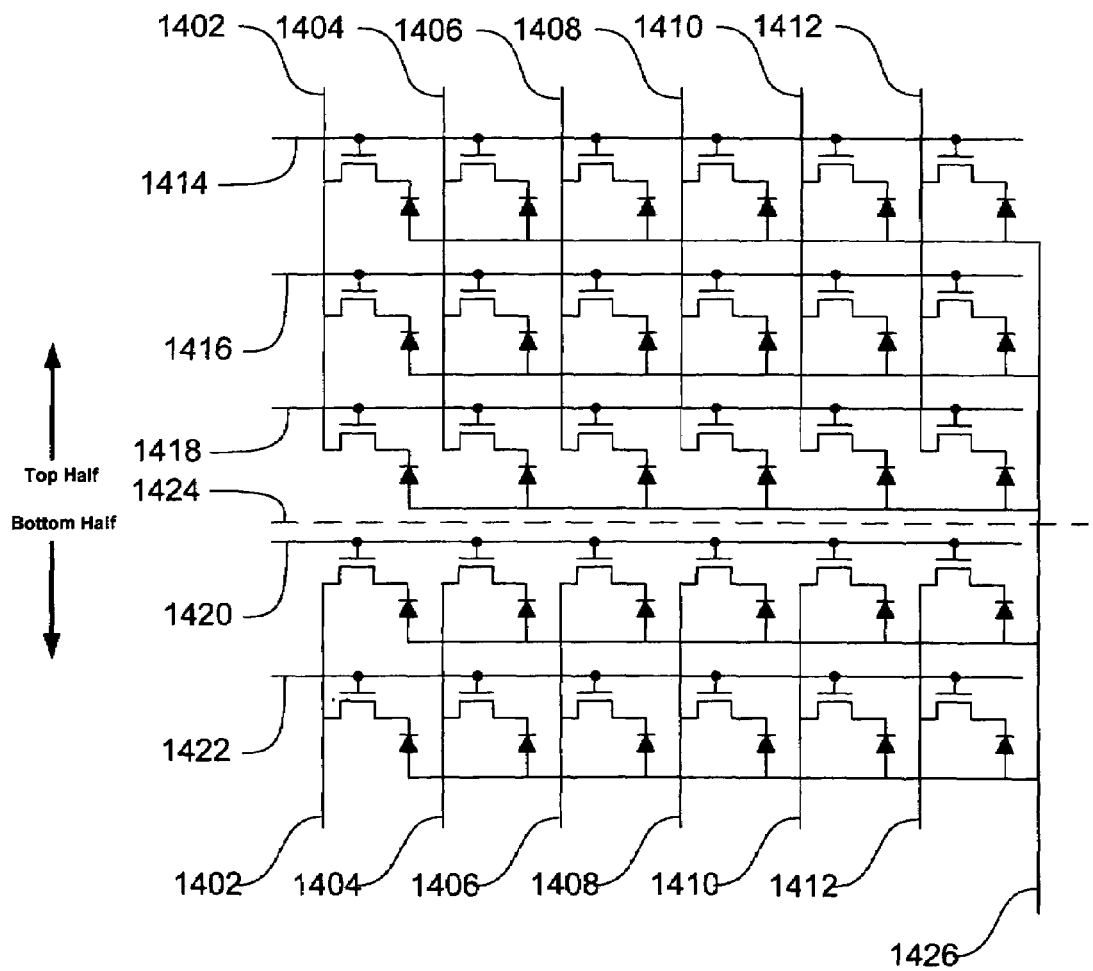
FIG. 14 is a diagram of a prior art schematic representation of a portion of prior art solid-state X-ray detector having split data lines.

FIG. 14 is a diagram of a prior art partial schematic representation of a portion of prior art solid-state X-ray detector 1400 having split data lines. The portion 1400 is implemented in both medical radiographic and medical cardiographic angiographic, mammographic, and radiographic and fluoroscopic (R&F) detectors.

The solid-state X-ray detector 1400 includes data lines 1402, 1404, 1406, 1408, 1410 and 1412. The solid-state X-ray detector 1400 also includes scan lines 1414, 1416, 1418, 1420 and 1422. The data lines are divided by a split 1424 into a bottom half and a top half. The solid-state X-ray detector 1400 also includes a common contact 1426.

CONCLUSION

An X-ray calibration and normalizing system is described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application with respect to X-Ray systems solid-state X-ray detectors is meant to include all X-Ray systems and solid-state X-ray detector environments and alternate technologies which provide the same functionality as described herein.

We claim:

1. A computer-accessible medium having executable instructions to generate a gain image of a solid-state X-Ray detector suitable for calibration of at least one image from the solid-state X-Ray detector, the executable instructions capable of directing a processor to perform:
   scrubbing the solid-state X-Ray detector; and
   simulating a flat-field X-Ray exposure of the solid-state X-Ray detector in reference to an adjusted bias of the solid-state X-Ray detector, yielding the gain image of the solid-state X-Ray detector.

2. The computer-accessible medium of claim 1, wherein the simulating further comprises:
   adjusting the bias of the solid-state X-Ray detector; and
   reading the solid-state X-Ray detector after a delay time period, yielding a gain image of the solid-state X-Ray detector.

3. The computer-accessible medium of claim 2, wherein adjusting the bias further comprises:
   changing a common potential at a common contact of the solid-state X-Ray detector.

4. The computer-accessible medium of claim 3, wherein changing a common potential further comprises:
   changing a common potential in a plurality of gradiations from a low dynamic range to a high dynamic range.

5. The computer-accessible medium of claim 4, wherein the plurality of gradiations further comprise:
   four gradiations.

6. The computer-accessible medium of claim 1, wherein the solid-state X-Ray detector further comprises an array of photodiodes, and the scrubbing further comprises:
   charging each photodiode of the detector to a known voltage.

7. The computer-accessible medium of claim 1, the medium further comprising executable instructions capable of directing a processor to perform:
   calibrating the solid-state X-Ray detector from the gain image.

8. The computer-accessible medium of claim 1, the medium further comprising executable instructions capable of directing a processor to perform:
   generating a gain map of the solid-state X-Ray detector from the gain image of the solid-state X-Ray detector; and
   normalizing an X-ray image from the solid-state X-Ray detector in reference to the gain map.

9. The computer-accessible medium of claim 1, wherein the executable instructions are performed as a background process.

10. A computer-accessible medium having executable instructions to normalize an image of a solid-state X-Ray detector, the executable instructions capable of directing a processor to perform:
scrubbing the solid-state X-Ray detector;
changing a common potential at a common contact of the solid-state X-Ray detector;
delaying;
a first reading of the solid-state X-Ray detector, yielding a gain image of the solid-state X-Ray detector;
a second reading the solid-state X-Ray detector after the first reading, yielding an offset image of the solid-state X-Ray detector;
generating a gain map of the solid-state X-Ray detector from the gain image and the offset image of the solid-state X-Ray detector; and
normalizing the X-ray image from the solid-state X-Ray detector in reference to the gain map.

11. The computer-accessible medium of claim 10, further comprising executable instructions capable of directing the processor to perform:
identifying bad pixels of the solid-state X-Ray detector from the gain image and the offset image.

12. The computer-accessible medium of claim 10, wherein the delaying further comprises:
delaying a predetermined time period.

13. The computer-accessible medium of claim 10, wherein the delaying further comprises:
delaying until all of a plurality of data lines of the solid-state X-Ray detector are about fully charged.

14. The computer-accessible medium of claim 10, wherein the delaying further comprises:
setting all of a plurality of scan lines of the solid-state X-Ray detector to an off state; and
charging all of a plurality of data lines of the solid-state X-Ray detector.

15. The computer-accessible medium of claim 10, wherein the executable instructions are performed as a background process.

16. A computer-accessible medium having executable instructions to normalize an image of a solid-state X-Ray detector, the executable instructions capable of directing a processor to perform:
scrubbing the solid-state X-Ray detector;
changing a common potential at a common contact of the solid-state X-Ray detector;
delaying
a first reading of the solid-state X-Ray detector, yielding a gain image of the solid-state X-Ray detector;
generating a gain map of the solid-state X-Ray detector from the gain image of the solid-state X-Ray detector;
normalizing the X-ray image from the solid-state X-Ray detector in reference to the gain map;
scrubbing the solid-state X-Ray detector;
delaying;
a second reading the solid-state X-Ray detector after the first delaying reading, yielding an offset image of the solid-state X-Ray detector; and
identifying bad pixels of the solid-state X-Ray detector from the gain image and the offset image.

17. A method to generate a normalized image of a solid-state X-Ray detector comprising:
scrubbing the solid-state X-Ray detector;
changing a common potential at a common contact of the solid-state X-Ray detector;
holding scan lines of the solid-state X-Ray detector at an "off" state;
charging a plurality of data lines of the solid-state X-Ray detector;
cycling sequentially each of the scan lines to an "on" state;
reading the plurality of data lines of the solid-state X-Ray detector during the cycling, yielding a gain image of the solid-state X-Ray detector;
generating a gain map of the solid-state X-Ray detector from the gain image of the solid-state X-Ray detector; and
normalizing an X-ray image from the solid-state X-Ray detector in reference to the gain map.

18. The method of claim 17, wherein the solid-state X-Ray detector further comprises:
a medical solid-state X-Ray detector.

19. A method to generate a normalized image of a solid-state X-Ray detector comprising:
scrubbing the solid-state X-Ray detector;
adjusting the bias of the solid-state X-Ray detector;
reading the solid-state X-Ray detector after a delay time period, yielding a gain image of the solid-state X-Ray detector; and
calibrating the solid-state X-Ray detector from the gain image.

20. The method of claim 19, the method further comprising:
generating a gain map of the solid-state X-Ray detector from the gain image of the solid-state X-Ray detector, the gain map being suitable to calibrate a X-ray image from the solid-state X-Ray detector; and
normalizing an X-ray image from the solid-state X-Ray detector in reference to the gain map.

21. The method of claim 19, wherein the solid-state X-Ray detector further comprises:
a medical radiographic detector.

22. The method of claim 19, wherein the solid-state X-Ray detector further comprises:
a medical cardiographic detector.

23. The method of claim 19, wherein the method is performed as a background process.

24. An X-Ray system comprising:
an electronic X-Ray detector;
a processor operably coupled to the electronic X-Ray detector;
a storage device operably coupled to the processor; and
software apparatus operative on the processor for:
changing a bias of the electronic X-Ray detector;
holding a scan drive control of the electronic X-Ray detector at an "off" state;
reading the electronic X-Ray detector after a delay time period, yielding a gain image of the electronic X-Ray detector;
calibrating the electronic X-Ray detector from the gain image, and
normalizing an X-ray image from the solid-state X-Ray detector in reference to the gain image.

25. The method of claim 24, wherein the electronic X-Ray detector further comprises:
a medical electronic X-Ray detector.

26. The method of claim 25, wherein the medical electronic X-Ray detector further comprises:
a medical radiographic electronic X-Ray detector.

27. The method of claim 25, wherein the medical electronic X-Ray detector further comprises:

a medical cardiographic electronic X-Ray detector.

28. A method to generate a normalized image of a solid-state X-Ray detector comprising:

scrubbing the solid-state X-Ray detector;

adjusting the bias of the solid-state X-Ray detector;

reading the solid-state X-Ray detector after a delay time period, yielding a gain image of the solid-state X-Ray detector;

calibrating the solid-state X-Ray detector from the gain image; and heuristically adapting data selected from the group consisting of the bias and the delay time period.

29. The method of claim 28, wherein the solid-state X-Ray detector further comprises:

a medical diagnostic electronic X-Ray detector.

* * * * *